Nov. 22, 1949  W. D. TEAGUE, JR  2,488,647
VALVE
Filed Nov. 16, 1944
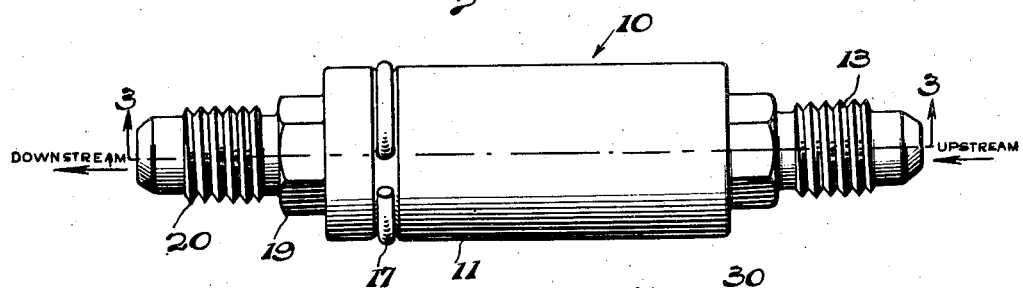
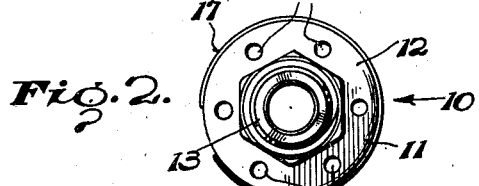
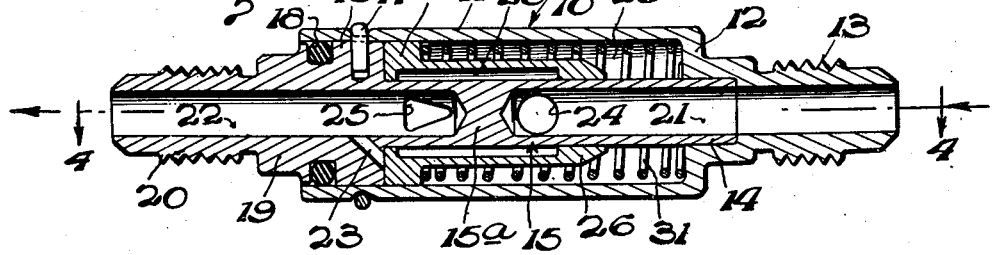
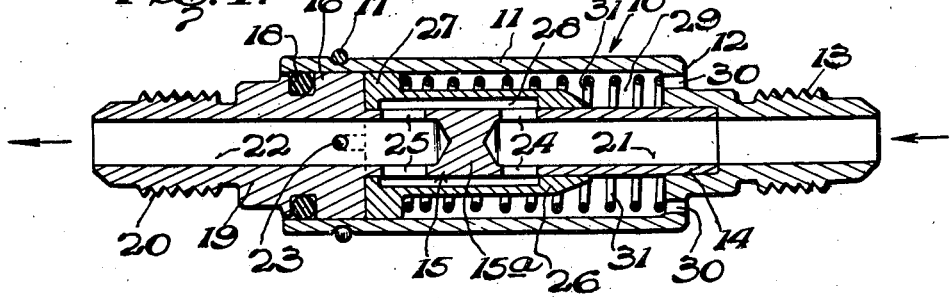
Inventor
Walter D. Teague, Jr.
By Robert F. Beck
Attorney Patented Nov. 22, 1949

2,488,647

UNITED STATES PATENT OFFICE 2,488,647

VALVE

Walter D. Teague, Jr., Alpine, N. J., assignor to Bendix Aviation Corporation, Teterboro, N. J., a corporation of Delaware Application November 16, 1944, Serial No. 563,769

3 Claims. (Cl. 50—35)

My invention relates to valves and particularly to valves of the pressure throttling type.

One of the objects of my invention is to provide a valve of the above described character which is provided with flow responsive means of a relatively high sensitivity for controlling the pressure, whereby instruments and devices of a sensitive and precisional type may be accurately operated.

Another object of my invention is to provide a valve of the above described character which is provided with means for maintaining pressure at a desired value and which may be readily replaced to modify or change the value.

A further object of my invention is to provide a valve of the foregoing described character which is simple in construction, durable in use, efficient in operation, economical in manufacture, easy of installation and which lends itself to high productivity.

The above and other objects and features of the invention will appear more fully hereinafter from a consideration of the following description taken in connection with the accompanying drawing wherein one embodiment of the invention is illustrated by way of example.

In the drawing:

Figure 1 is a side elevation of an air pressure throttling valve constructed in accordance with my invention;

Figure 2 is an end elevation of the valve of Figure 1, viewed from the right;

Figure 3 is a sectional view taken on the line 3—3 of Figure 1, showing the parts as positioned during the inactive condition of the device; and Figure 4 is a sectional view taken on the line 4—4 of Figure 3.

In the form of the invention disclosed in Figures 1 to 4 inclusive of the drawings, the valve 10 is of an air pressure throttling type adapted to be employed in a system for operating various pressure operated instruments and devices and when so employed it is located in the system between an air source and the instrument or device to be operated whereby the air pressure to the device is regulated in accordance with a desired pressure, one example of its many uses being in the maintaining of a constant air pressure in the fuel tank of an aircraft or the like. As disclosed, the valve 10 comprises a housing member 11 which is open at one end and provided with a radial wall 12 at the opposite end, the wall 12 being formed with a fitting 13 for connection to a pipe or the like leading from the fluid pressure source or upstream of the aforementioned system. The fitting 13 is provided with a bore formed inwardly with a counterbore constituting a seat in which is seated the inner end section 14 of a pilot member 15 disposed in the housing member and formed with a collar 16 closing the open end of the housing member and secured thereto by means of a detachable ring 17.

The collar 16 is formed with a circumferential groove in which is contained a suitable packing 18 forming a seal between the collar and housing member 11. The outer end section 19 of the pilot member is formed with a fitting 20, similar to the fitting 13 for connection to a pipe or the like leading to the fluid pressure operated element or the downstream of the system. The inner and outer end sections 14 and 19 of the pilot member are provided with axially aligned spaced passages 21 and 22 respectively and which are separated by a wall or partition 15a. The inner radial face of the collar is formed with an outlet aperture 23 which communicates with the passage 22. On one side of the partition 15a, the circumferential face of the pilot member is formed with a pair of oppositely disposed ports 24 communicating with the passage 21 and on the other side with a pair of similarly arranged triangular-shaped ports 25 communicating with the passage 22.

Slidably mounted upon the pilot member is a sleeve constituting a valve member 26 which is formed, on the end adjacent the collar 16, with a head 27 and, on its inner circumferential face, with a channel 28 about the pilot member for effecting communication between the ports 24 and 25. The head 27 is adapted for abutting engagement with the collar 16, and serves to control the ports 25 upon movement of the valve member relative to the pilot member as hereinafter more fully described. The valve member 26 coacts with the inner section 21 of the pilot member to define a chamber 29 within the housing which communicates with the atmosphere by means of inlet openings 30 formed in the wall 12 whereby atmospheric pressure is always present in the chamber 29. Sleeved about the valve member is a spring 31 having one end engaging the head 27 and the opposite end engaging the end wall 12, said spring serving to urge the valve member into engagement with the collar 16 to maintain communication between the ports 24 and 25 through the channel 28.

In operation, the parts being in the positions disclosed in the drawings, air from the upstream of the system is introduced into the passage 21 of the pilot member and into the channel 28 of the valve member through the ports 24 and from the channel 28 into the passage 22 through the ports 25. When the pressure within the passage 22 rises to a sufficient differential over atmospheric pressure within the chamber 29, the valve member 26 will be moved towards the end wall 12 by pressure acting against the head 27 through the aperture 23 and against the force of the spring 31 thus causing the head to gradually restrict or close the ports 25 until the pressure in the passage 22 decreases sufficiently to permit reverse movement of the valve member. Obviously, by selecting the spring with a desired force and rate value, the pressure in the passage 22 is limited to a desired value and a slight variation of the pressure in the passage 22 will be obtained with flow variations in the passage 21, the amount of variation in the passage 22 depending upon the rate value of the spring. By removing the ring 17, disassembly of the housing and pilot members may be had to readily replace the spring with another of a different value and thus condition the valve member for response to another desired pressure value in the passage 22.

Although only one embodiment of the invention has been illustrated and described, changes in the form and relation of the parts may be effected to suit requirements.

What is claimed is:

1. A pressure throttling device comprising a cylinder open at one end and including a wall at the other end embodying a pipe-attachment having a counterbore opening into the cylinder, the cylinder having an outer peripheral groove, a radial hole through the cylinder side in the groove, and an annular inner seal surface; a tube having an inlet end telescoping said counterbore and extending therefrom to an outlet pipe-connector end of the tube beyond said open cylinder end, said tube having an outer peripheral groove holding a ring seal against said seal surface, a portion constituting a transverse wall of the cylinder having a recess radially opposite said hole, and a partition closing the tube bore between said walls; a valve sleeve having an outlet end piston fitting said cylinder and the sleeve disposed about and having bearing ends axially slidable on the tube which bearings, in position corresponding to the inactive condition of the device, are at opposite sides of said partition, said sleeve forming a channel around the tube between said bearings, said tube having side ports between the tube bore and said channel at opposite sides of said partition, one of said bearing ends being adapted to vary the area of said outlet port, said tube having a passage from the tube bore at the downstream side of said outlet port to the adjacent side of said piston, spring means around the sleeve in the cylinder and acting oppositely between said first wall and said piston, and a split spring ring contractingly fitting said groove having an inturned end slip fitting said hole and said recess.

2. A pressure throttling device comprising a tube including an intermediate bore closure partition dividing the bore into inlet and outlet lengths having inlet and outlet side-wall ports, respectively, a sleeve valve forming a cylindrical channel around the tube axially defined by annular portions of the sleeve axially slidably fitting the tube which while in position, corresponding to the inactive condition of the device, uncover said ports to said channel and close them to the exterior of the sleeve and provide for flow through the tube from said inlet through said channel to said outlet section, said sleeve having a radially outer piston head, one of said axially slidable portions being operative upon movement of the sleeve in the direction from the outlet toward the inlet port to gradually close the outlet port to said channel, a cylinder for said piston cooperating with the tube to form a chamber for the sleeve, which chamber is closed except for vent opening means, and spring means biasing the sleeve axially in direction from the inlet toward the outlet port, said tube forming passage means from said outlet length to the adjacent side of said piston.

3. A pressure throttling device comprising means having a bore divided into inlet and outlet lengths closed to each other and each having a side port, means forming a chamber having a vent and surrounding and sealed relative to said first means, a sleeve valve in said chamber axially slidably telescoping the first means and cooperating therewith to form a cylindrical channel between the sleeve and the first means which, in position corresponding to the inactive condition of the device, provides communication between said ports, said valve having a piston head and having means biasing said head toward said position, and means providing fluid pressure communication between said outlet length and the adjacent side of said piston opposing said biasing means and rendering the valve responsive to predetermined pressures in said outlet length for varying the area of said outlet side port.

WALTER D. TEAGUE, JR.

REFERENCES CITED

The following references are of record in the file of this patent:

UNITED STATES PATENTS

| Number | Name | Date |
|---|---|---|
| 383,314 | McLaughlin | May 22, 1888 |
| 444,082 | Abbe | Jan. 6, 1891 |
| 970,225 | Holden | Sept. 15, 1910 |
| 1,343,375 | Peppercorn | June 15, 1920 |
| 1,589,224 | Rabe | June 15, 1926 |
| 1,900,514 | McLean | Mar. 7, 1933 |
| 2,059,808 | Robart | Nov. 3, 1936 |
| 2,217,056 | Johnson | Oct. 8, 1940 |